US008963505B2

(12) United States Patent
Odaohhara et al.

(10) Patent No.: US 8,963,505 B2
(45) Date of Patent: Feb. 24, 2015

(54) METHOD AND APPARATUS FOR CHARGING BATTERIES

(75) Inventors: Shigefumi Odaohhara, Yamato (JP); Tin-Lup Wong, Chapel Hill, NC (US); Kenneth Scott Seethaler, Wake Forest, NC (US)

(73) Assignee: Lenovo (Singapore) Pte Ltd., Singapore (SG)

( * ) Notice: Subject to any disclaimer, the term of this patent is extended or adjusted under 35 U.S.C. 154(b) by 334 days.

(21) Appl. No.: 13/248,057

(22) Filed: Sep. 29, 2011

(65) Prior Publication Data

US 2012/0081068 A1  Apr. 5, 2012

(30) Foreign Application Priority Data

Oct. 4, 2010  (JP) .................................. 2010-224851

(51) Int. Cl.
*H02J 7/04* (2006.01)
*H02J 7/16* (2006.01)
*H02M 3/158* (2006.01)

(52) U.S. Cl.
CPC ............. *H02J 7/045* (2013.01); *H02M 3/1588* (2013.01); *Y02B 70/1466* (2013.01)
USPC .......................................... 320/141; 320/162

(58) Field of Classification Search
USPC .................. 320/148, 141, 164, 162
See application file for complete search history.

(56) References Cited

U.S. PATENT DOCUMENTS

| 6,087,810 | A  | * | 7/2000  | Yoshida .......................... 320/139 |
| 7,301,308 | B2 | * | 11/2007 | Aker et al. ..................... 320/139 |
| 7,683,586 | B2 | * | 3/2010  | Davison et al. ............... 320/166 |
| 7,969,756 | B1 | * | 6/2011  | Wu .................................. 363/46 |
| 8,228,047 | B2 | * | 7/2012  | Li et al. .......................... 323/266 |
| 2003/0201758 | A1 | * | 10/2003 | Chen .............................. 323/222 |
| 2005/0162142 | A1 | * | 7/2005  | Kernahan et al. ............. 323/283 |
| 2006/0061330 | A1 | * | 3/2006  | Sato et al. ...................... 320/125 |
| 2011/0018500 | A1 | * | 1/2011  | Takahashi ..................... 320/148 |
| 2012/0098510 | A1 | * | 4/2012  | Galtie et al. ................... 323/282 |
| 2012/0223693 | A1 | * | 9/2012  | Tang et al. ..................... 323/283 |

FOREIGN PATENT DOCUMENTS

| CN | 101026316 A | 8/2007 |
| CN | 101540513 A | 9/2009 |
| JP | 09-121462   | 5/1997 |
| JP | 11-155281   | 6/1999 |
| JP | 2002-090824 | 3/2002 |
| JP | 2010-178608 | 8/2010 |
| JP | 2011-091889 | 5/2011 |
| WO | 2008050619 A | 5/2008 |

* cited by examiner

*Primary Examiner* — Richard V Muralidar
*Assistant Examiner* — David Henze-Gongola
(74) *Attorney, Agent, or Firm* — Antony P. Ng; Russell Ng PLLC

(57) ABSTRACT

A charge system is disclosed. A charge system includes a switching device and a controller. The switching device performs switching of a DC input voltage at a predetermined switching frequency to generate an output voltage, and the output voltage being utilized for charging said battery. The controller allows the switching device to operate at a first switching frequency immediately after starting of charge and at a second switching frequency when a frequency changing condition holds. The second switching frequency is higher than that of first switching frequency.

9 Claims, 6 Drawing Sheets

METHOD AND APPARATUS FOR CHARGING BATTERIES

PRIORITY CLAIM

The present application claims benefit of priority under 35 U.S.C. §§120, 365 to the previously filed Japanese Patent Application No. JP2010-224851 entitled, "CHARGE SYSTEM AND CHARGE METHOD" with a priority date of Oct. 4, 2010, which is incorporated by reference herein.

BACKGROUND

1. Technical Field

The present invention relates to battery chargers in general, and in particular to a method for suppressing heat generated by a semiconductor switch within a battery charger.

2. Description of Related Art

Battery chargers employed for charging a battery with a DC/DC converter generate a DC output voltage from a DC input voltage by controlling a semiconductor switching device such as a MOS-FET in a Pulse Width Modulation (PWM) manner or a Pulse Frequency Modulation (PFM) manner. Under PWM, the ON duration of a switching device is controlled so that a switching frequency as a function of a period corresponding to the total duration of the ON duration and the OFF duration is made constant. Under PFM, the OFF duration is controlled while making the ON duration constant in order to change a switching frequency, thus controlling an output voltage within a certain range.

In addition to a switching device, a battery charger also includes an integrated circuit device for control, an inductor and a smoothing capacitor. The switching device is required to suppress a temperature rise due to heat generated during operation within a predetermined range. The amount of heat generation by a switching device depends on constants unique to the switching device such as ON resistance, gate charge capacitance, turn-on/turn-off time, circuit constants such as an input voltage and an output current (charge current) and switching frequency.

Battery chargers are typically designed by choosing a switching device for the input voltage, and the output voltage dictates the switching frequency. Since a DC/DC converter includes a ripple component in the output voltage in theory, permissible ripple content also needs to be considered for the battery charger design. The ripple content increases with a decrease in the switching frequency. Thereafter, an inductor suitable for output current is selected, and finally a capacitor for placing a ripple voltage within a permissible range is selected. The amount of heat generation decreases with a switching frequency, and therefore a compact switching device can be used. However, ripple current will also increase, which results in an increase in the sizes of the inductor and the capacitor in order to control the ripple voltage within a predetermined range.

Lithium batteries are charged in a constant voltage/constant current manner. Lithium batteries have to be charged while strictly controlling the upper limit of a charge voltage to a battery cell so as to keep the safety and suppress the degradation, and so an overvoltage protection circuit is provided to control the maximum value of the charge voltage. While battery charging is being performed in a constant voltage area, the output voltage of a battery charger reaches a maximum value. Thus, when a large ripple voltage superimposed on the output voltage, the overvoltage protection circuit will begin to operate.

The output voltage in the constant voltage area can be lowered in order to keep the overvoltage protection circuit from start operating even when the ripple voltage increases. However, it is not preferable to have the output voltage being lowered more than what's required because the battery will not be able to reach a full charge capacity at the completion of the battery charging process. Therefore, conventional battery chargers using a DC/DC converter in a PWM manner tend to maintain a switching frequency at a certain high value so as not to let an overvoltage protection circuit operate from the battery charging period at a constant voltage area to the charging period at a constant current area.

Recently, lithium batteries capable of being charged in a relatively short time using a large charge current have become available. Since the battery chargers for quickly charging such quick-charge type lithium batteries have to supply a large current, heat generated due to power loss of a switching device in a DC/DC converter begins to present a problem. In order to cope with this problem, a large-capacity switching device may be used, which introduces another problem of an increase in size and cost of battery chargers.

SUMMARY

As a result of the analysis of the battery charging properties, it has been found that battery chargers are not required to put the ripple content within a predetermined range over the entire charge duration from the beginning and the end of the charge, which is different from a DC/DC converter supplying power to a device. Accordingly, when a switching frequency can be lowered within a certain range of the charge duration on the basis of such charge properties, rapid charging can be performed without using a battery charger having a switching device with a capacity larger than what's required. The present disclosure provides a battery charger capable of charging a battery with a relatively large charge current using a switching device with a relatively small capacitance. In accordance with a preferred embodiment of the present invention, a battery charger includes a switching device and a controller. The switching device performs switching of a DC input voltage at a predetermined switching frequency to generate an output voltage, and the output voltage being utilized for charging the battery. The controller allows the switching device to operate at a first switching frequency immediately after starting of charging and to operate at a second switching frequency when a frequency changing condition holds. The second switching frequency is higher than that of the first switching frequency.

All features and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF A PREFERRED EMBODIMENT

[Configuration of a Portable Computer]

Figure 1:
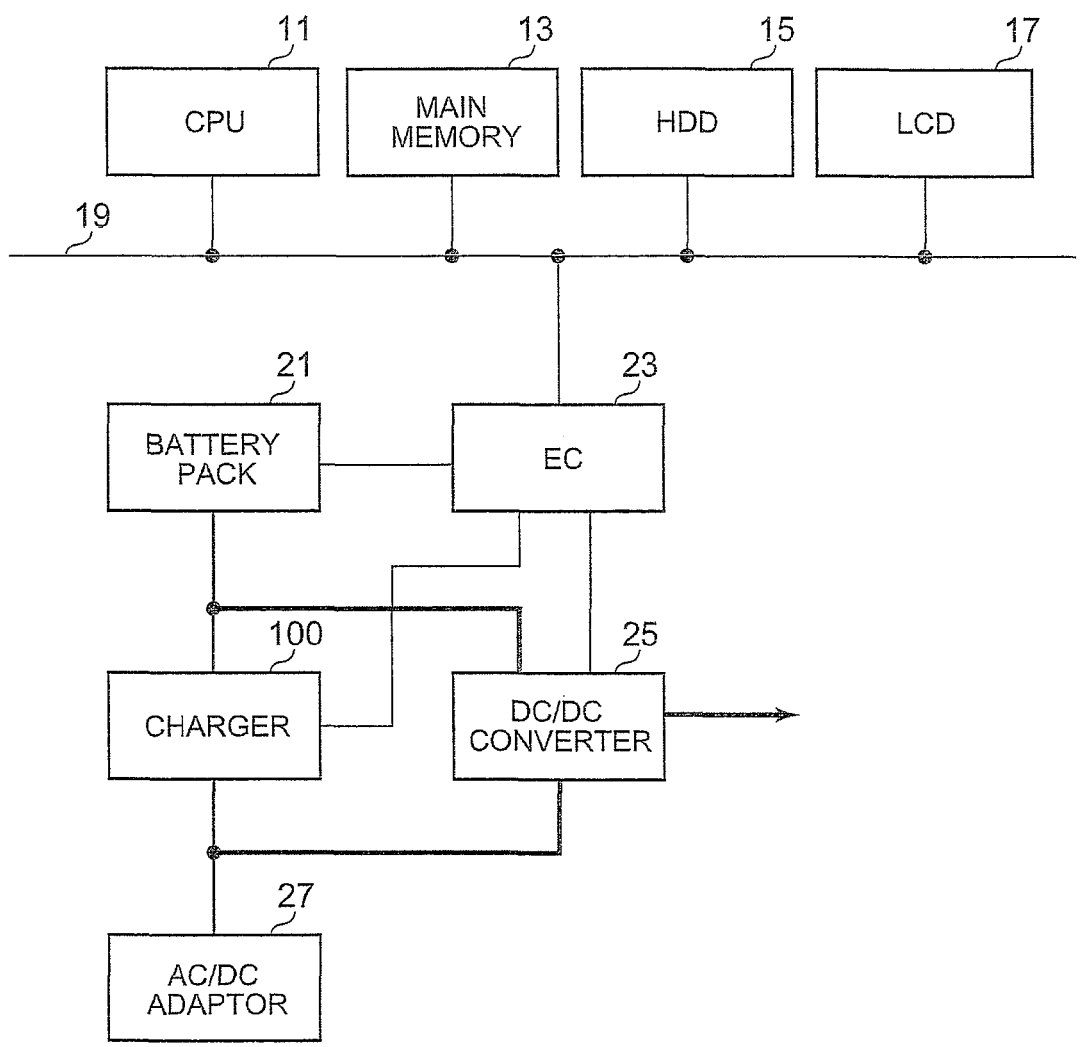
FIG. 1 is a block diagram of a portable computer according to the present embodiment.

FIG. 1 is a block diagram of a portable computer 10 according to the present embodiment. In FIG. 1, thick lines connecting elements represent power lines and thin lines represent signal lines. The portable computer 10 includes a CPU 11, a main memory 13, a hard disk drive (HDD) 15, a LCD 17 and the like, which are connected with a bus 19. Since these elements simply perform well-known functions in the present invention, descriptions on these elements are omitted. The bus 19 is connected to an embedded controller (EC) 23.

The EC 23 is a microcomputer made up of a CPU, a ROM, a RAM and the like, and further includes an A/D input terminal, a D/A output terminal, a timer and a digital input/output terminal of a plurality of channels. The EC 23 is connected with a battery pack 21, a charger 100 and a DC/DC converter 25 via signal lines. The EC 23 operates independently of the CPU 11 to control the operation of the DC/DC converter 25 so as to manage the power of the portable computer 10 or to control the rotation speed of a radiating fan not illustrated for the management of a temperature of the device.

The EC 23 and the battery pack 21 are connected via a SM bus so that the EC 23 can receive information from the battery pack 21 such as a set current value as a reference to control the output current during constant current charge duration, a set voltage value as a reference to control the output voltage during constant voltage charge duration and a voltage and a state of charge (SOC) of a battery cell. The EC 23 sets the set current value and the set voltage value at the charger 100 on the basis of the information received from the battery pack 21.

An AC/DC adaptor 27 converts an AC voltage from a commercial power source into a DC voltage at 20V to supply power to the charger 100 and the DC/DC converter 25. The battery pack 21 complies with the smart battery system (SBS) standard, and supplies power to the DC/DC converter 25 while the AC/DC adaptor 27 does not supply power to the portable computer 10. The battery pack 21 includes a battery set including three lithium secondary battery cells connected in series, an overvoltage/overcurrent protection circuit, a temperature protection circuit, a remaining electrical amount meter to calculate a remaining electricity amount and the like. Since each lithium secondary battery cell sets a charge voltage at 4.2 V, a set voltage of the charger 100 becomes 12.6 V.

The overvoltage protection circuit is configured to operate in two stages so that when the charge voltage of the battery cell exceeds a first-stage threshold, a recoverable switching device operates and when the charge voltage further exceeds a second-stage threshold higher than the first-state threshold, a protection fuse melts. The protection fuse is configured so that, when the charge voltage exceeds a predetermined value, current flows through a heat-generating element and a low-melting-point metal melts in order to protect the battery cell. The battery cell is of a quick-chargeable type.

Although the lithium secondary battery is basically charged with a charge current of 1 C, it often is charged with a smaller charge current such as 0.7 C or 0.5 C to extend the life of the battery. The unit C of the battery current corresponds to a current value such that when a battery cell having a nominal capacity is charged with a constant current, the charge is completed in one hour. For instance, when a battery cell of 1 Ah is charged at 1 A, the current value will be 1 C, and when the battery cell is charged at 5 A, the current value will be 5 C. In the present specification, when charge is performed with a charge current of 1 C or lower, the charge is called normal charge, and when charge is performed with a charge current exceeding 1 C, such charge is called quick charge.

Whether a battery is quickly chargeable or not depends on the performance of the battery, and if a battery that cannot be charged by quick charge is charged with a charge current of 1 C or more, a safety problem will arise. The battery pack indicates quick charge or normal charge with a current value requested through the EC 23. The charger 100 includes a switching device selected so as to be suitable for normal charge, but can undergo quick charge by changing of a switching frequency according to the present invention. However, when receiving a request for a charge current of normal charge from the battery pack 21 via the EC 23, the charger 100 operates so as to charge with the requested charge current.

When receiving a request for charge with a charge current exceeding a rated output current from the battery pack 21, the charger 100 operates to charge with the rated output current. The DC/DC converter 25 supplies power at a predetermined voltage to devices making up the portable computer 10. Since the DC/DC converter 25 receives power from the AC/DC adaptor 27 while the AC/DC adaptor 27 is connected therewith, the DC/DC converter 25 is not affected even when a switching frequency of the charger 100 is changed.

[Configuration of a Charger]

Figure 2:
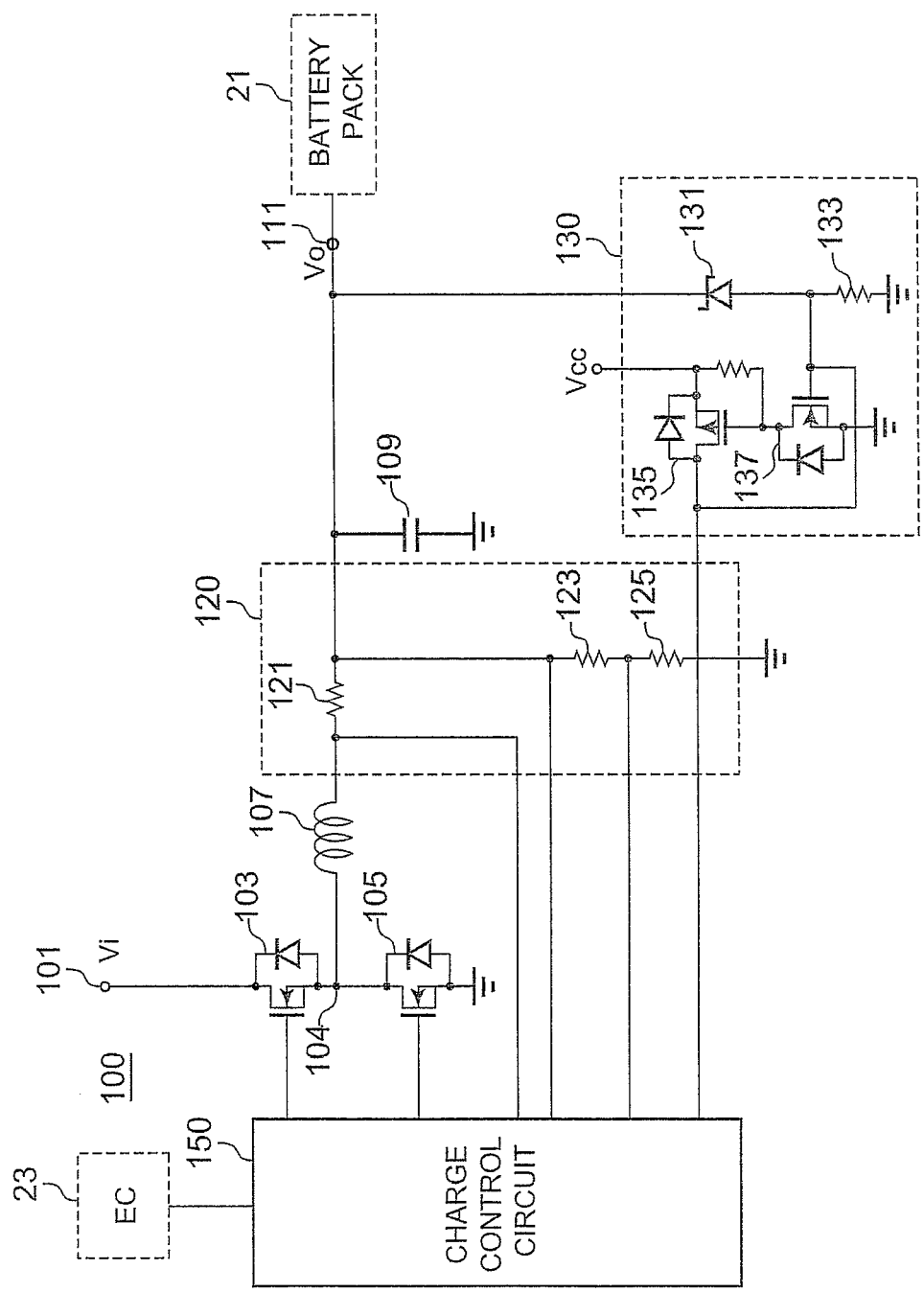
FIG. 2 is a block diagram of a battery charger according to the present embodiment.
Figure 3:
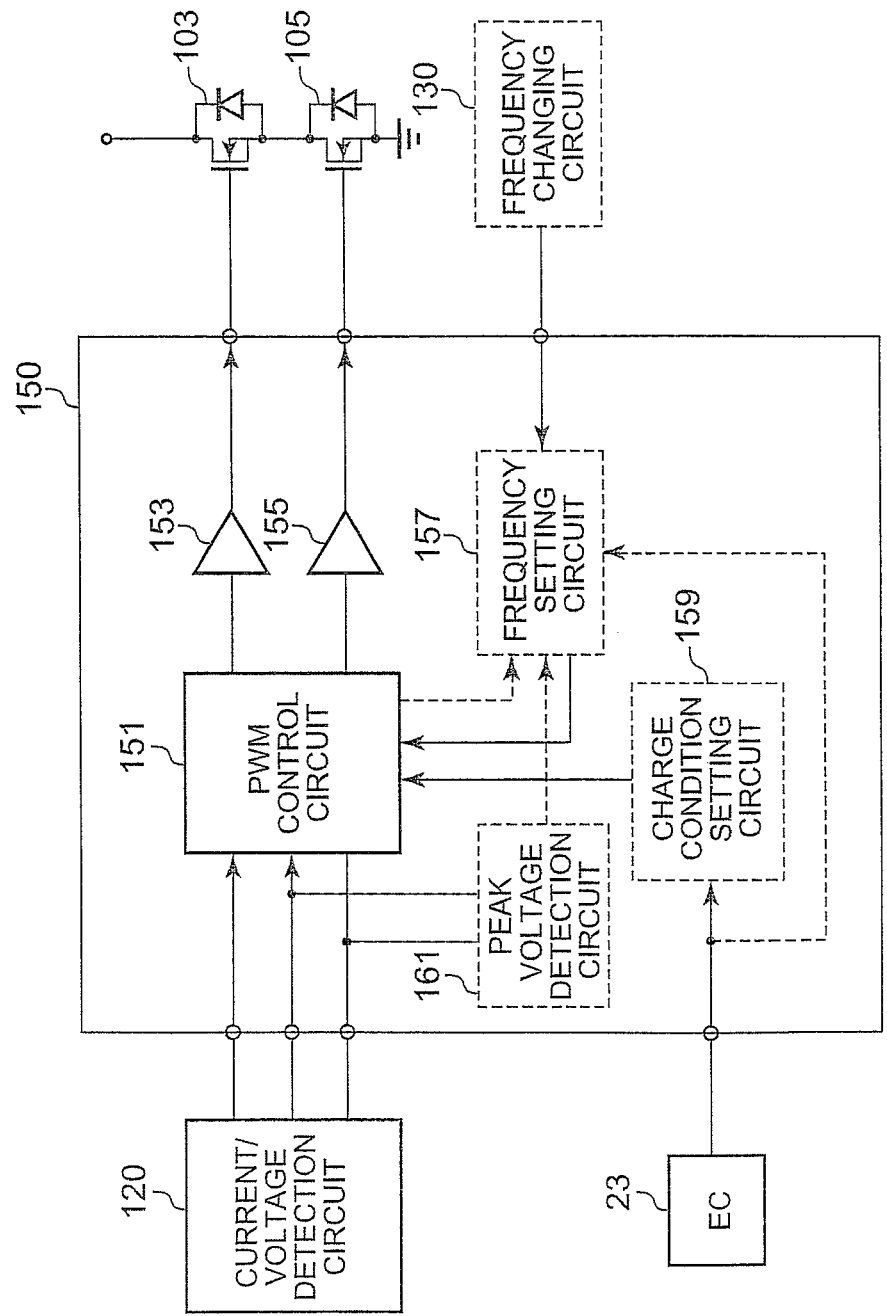
FIG. 3 is a block diagram of a charge control circuit.

FIG. 2 is a block diagram of the charger 100 according to the present embodiment, and FIG. 3 is a block diagram of a charge control circuit 150. The charger 100 includes the charge control circuit 150, a high-side FET 103, a low-side FET 105, an inductor 107, a smoothing capacitor 109, a current/voltage detection circuit 120 and a frequency changing circuit 130. The charger 100 operates as a DC/DC converter of a step down type that charges the battery pack 21 in a synchronous rectification manner, a PWM manner and a constant current/constant voltage (CCCV) control manner.

The elements making up the charger 100 are surface-mounted on a mother-board or a daughter-board of the portable computer 10. The charge control circuit 150 is made up of a semiconductor chip, including a PWM control circuit 151, a high-side driver 153, a low-side driver 155, a frequency setting circuit 157 and a charge condition setting circuit 159. A peak voltage detection circuit 161 and signal paths indicated with dotted lines of FIG. 3 will be described later. The frequency setting circuit 157 sets a switching frequency at the PWM control circuit 151 on the basis of a frequency changing signal received from the frequency changing circuit 130. The charge condition setting circuit 159 sets a set current value and a set voltage value received from the EC 23 at the PWM control circuit 151.

The high-side driver 153 is connected with a gate of the FET 103, and the low-side driver 155 is connected with a gate of the FET 105, thereby applying voltages so that the corresponding FETs 103 and 105 operate at a predetermined switching frequency on the basis of a signal from the PWM control circuit 151. The PWM control circuit 151 lets the FET 103 and the FET 105 operate so as to turn ON and OFF alternately in a synchronous rectification manner. The PWM control circuit 151 includes a shoot through prevention circuit to prevent the FET 103 and the FET 105 from turning ON simultaneously.

The PWM control circuit 151 includes an operating amplifier, a triangle wave oscillation circuit, a comparator and the like, and receives an output voltage and a voltage corresponding to an output current of the charger 100 from the current/voltage detection circuit 120. The PWM control circuit 151 can dynamically change a frequency of the triangle wave oscillation circuit on the basis of a signal received from the frequency setting circuit 157 to set switching frequencies of the FETs 103 and 105.

During the constant current charge duration, the PWM control circuit 151 performs feedback-control with a voltage corresponding to the output current received from the current/voltage detection circuit 120 to adjust the duty ratio and keep the set current value. During the constant voltage charge duration, the PWM control circuit 151 performs feedback-control with a voltage corresponding to the output voltage received from the current/voltage detection circuit 120 to adjust the duty ratio and keep the set voltage value. Whether the PWM control circuit 151 operates for constant current charge or for constant voltage charge depends on the output from the current/voltage detection circuit 120. That is, when the voltage of the battery cell is low and the output current is about to exceed the set current, the PWM control circuit 151 operates for constant current charge. Whereas, when the voltage of the battery cell becomes high and the output voltage is about to exceed the set voltage, the PWM control circuit 151 operates for constant voltage charge.

The duty ratio refers to the ratio of ON duration of the high-side FET 103 to one period of a switching frequency. The charger 100 is of a step down type, and converts the input voltage Vi into an output voltage Vo lower than the Vi in accordance with the duty ratio D. When switching control is performed under the condition of continuous continuity without interrupting the ripple current, the duty ratio D, the input voltage Vi and the output voltage Vo have the relationship of Vo=Vi×D. The output voltage increases with a duty ratio and conversely the output voltage decreases with a duty ratio.

Referring back to FIG. 2, the input voltage Vi is supplied to an input terminal 101 from the AC/DC adaptor 27. The input terminal 101 is connected with a drain of the FET 103, and a source of the FET 103 is connected with a drain of the FET 105 at an output part 104. A source of the FET 105 is grounded. Both of the FETs 103 and 105 are switching devices made of n-channel MOS-type FETs.

The current/voltage detection circuit 120 includes a sense resistor 121 generating a voltage corresponding to an output current, and bleeder resistors (voltage-dividing resistors) 123 and 125 generating a voltage corresponding to an output voltage. The output part 104 is connected with one of the terminals of the inductor 107, the other terminal of the inductor 107 is connected with one of the terminals of the sense resistor 121, and the other terminal of the sense resistor 121 is connected with an output terminal 111. The output terminal 111 is connected with the battery pack 21, to which the output voltage Vo is output. Between the other terminal of the sense resistor 121 and the ground are connected the bleeder resistors 123 and 125 connected in series, the smoothing capacitor 109 and the frequency changing circuit 130.

The frequency changing circuit 130 includes a zener diode 131, a p-channel MOS type FET 135 and a n-channel MOS type FET 137. The output terminal 111 is connected with a cathode of the zener diode 131, and an anode of the zener diode 131 is connected with one of the terminals of a resistor 133. The other terminal of the resistor 133 is grounded. The one of the terminals of the resistor 133 is connected with a gate of the FET 137 and the frequency setting circuit 157. A drain of the FET 135 is connected with the frequency setting circuit 157, a source thereof is connected with a power supply Vcc and a gate thereof is connected with a drain of the FET 137. A source of the FET 137 is grounded.

The following describes the operation of the frequency changing circuit 130. As described later, since the output voltage Vo includes a ripple component, the frequency changing circuit 130 is required to generate a stable frequency changing signal from the output voltage Vo and transmit the same to the frequency setting circuit 157. During the constant current charge duration and before the output voltage Vo including a ripple voltage reaches a breakdown voltage of the zener diode 131, the FET 137 and the FET 135 are OFF. Therefore, the input voltage of the frequency setting circuit 157 is low so that a frequency changing signal is negated. When the output voltage Vo reaches the breakdown voltage, the FET 137 and the FET 135 turn ON so that the input of the frequency setting circuit 157 becomes high with the power supply voltage Vcc and the frequency changing signal is asserted.

The frequency setting circuit 157 sets the PWM control circuit 151 so that the switching frequency becomes 200 KHz, for example, when the input is low and so that the switching frequency becomes 400 KHz, for example, when the input is high. Once the frequency changing signal is asserted, since the gate of the FET 137 is connected with the output of the frequency changing circuit 130, such a state is maintained even when the output voltage Vo is changed. Therefore, even when the output voltage Vo includes a large ripple component, the frequency changing circuit 130 can operate stably.

Then, when the charger 100 stops the operation, the control circuit 150 or the EC 23 stops the power supply voltage Vcc, whereby the frequency changing circuit 130 is reset. Herein, when the charger 100 operates next, the power supply voltage Vcc is supplied. Although the present embodiment describes the example of changing the switching frequency in two stages, the switching frequency may be changed to be increased in three stages or more. As the number of stages of the switching frequency increases, the charger can operate at a switching frequency with a minimum heat generation amount within the range where the protection fuse does not operate during the constant current charge duration. Note here that a semiconductor chip enabling dynamic changing of a switching frequency is well known.

FIG. 2 and FIG. 3 illustrate the simplified configuration and connection relationship of major hardware relating to the present embodiment to describe the present embodiment. Multiple blocks described in the drawing may be one integrated circuit or a device. Conversely, one block may be divided into a plurality of integrated circuits or devices, which may be included in the scope of the present invention within a range allowing those skilled in the art to select the configuration freely.

[Heat Generation at FETs]

Loss generated when MOS type FETs turn ON/OFF (hereinafter called FET loss) mainly includes continuity loss, gate charge loss and switching loss. The continuity loss is loss generated by a current flowing through a FET in an ON state and ON resistance. Let that the continuity loss of the high-side FET 103 is Pch and the continuity loss of the low-side FET 105 is Pcl, Pch and Pcl can be calculated by equations (1) and (2), respectively:

$$Pch = D \times Io^2 \times Ron \times \alpha \qquad (1)$$

$$Pcl = (1-D) \times Io^2 \times Ron \times \alpha \qquad (2)$$

where D denotes a duty ratio, Io denotes an rms value of the output current, Ron denotes ON resistance of each FET, and α denotes a constant. As is evident from the equations (1) and (2), the continuity loss is in proportion to the time duration when current flows, the square of the output current and the ON resistance. The gate charge loss Pgc is loss generated when gate capacity of a FET is charged, and can be calculated by equation (3) for the high-side FET and the low-side FET:

$$Pgc = Vgs \times Qg \times f \tag{3}$$

where Vgs denotes a voltage between gate and source, Qg denotes a gate charge capacity, and f denotes a switching frequency. As is evident from equation (3), the gate charge loss Pgc is in proportion to the voltage between gate and source, the gate charge capacity and the switching frequency. Switching loss Psw is loss generated by voltage between gate and source during transient duration when a FET turns ON or OFF and current flowing during the transient duration, which is generated only at the high-side FET. Such switching loss Psw can be calculated by the following equation (4):

$$Psw = \beta \times Vi \times Io \times (tr + tf) \times f \tag{4}$$

where β denotes a constant, Vi denotes an input voltage, Io denotes an output current, tr denotes a turn-on time, tf denotes a turn-off time and f denotes a switching frequency. The total time duration of the turn-on time and the turn-off time is called a switching time. As is evident from equation (4), the switching loss Psw is in proportion to the input voltage, the output current, the switching time and the switching frequency.

At the moment when the FET 103 and the FET 105 switch to each other, the shoot through prevention circuit forms a dead time to turn both of the FETs OFF once so as to prevent current from flowing to the ground. Thus, at timing when the low-side FET 105 turns ON, the input voltage Vi and the output current Io does not overlap, and at timing when a circulating current starts to flow, voltage is not applied to the inductor 107 because a parasitic diode of the low-side FET 105 operates, and therefore switching loss is not generated at the low-side FET 105.

According to equations (1) to (4), it can be understood that the FET loss increases with the switching frequency. The FET loss corresponds to heat generation amount of a FET and increases a temperature of the FET. Therefore, when the input voltage Vi and the output current Io are constant, a lower switching frequency can suppress a temperature rise of the FET. Since the ON resistance of a FET increases with a decrease of the rated current, a lower switching frequency enables the selection of a FET with a smaller rated current when the heat generation amount is the same.

[Ripple Voltage and Generation Timing of Frequency Changing Signal]

At the beginning of the charge at the constant current area, the charger 100 operates at a low switching frequency such as 200 KHz and when it approaches to the end of the constant current area, the charger 100 operates at a high switching frequency such as 400 KHz. The following describes the changing of this switching frequency. During ON duration or duty duration where the FET 103 is ON and the FET 105 is OFF, the charger 100 is configured so that current flowing from the input terminal 101 flows from the output part 104 to the battery pack 21 via the inductor 107 and the output terminal 111. During the ON duration, energy is stored in the inductor 107. During OFF duration or circulating duration where the FET 103 is OFF and the FET 105 is ON, the energy stored in the inductor 107 flows through the output terminal 111, the battery pack 21 and the FET 105 as a circulating current.

Through the inductor 107 flows current obtained by superimposing a ripple current $\Delta I_L$ (inter-peak value) on the output current Io as an average value. Through the smoothing capacitor 109 flows the ripple current $\Delta I_L$ as an AC component, and through the battery pack 21 flows the output current Io from which the ripple current flowing through the smoothing capacitor 109 is removed. When the charger 100 operates in a continuous continuity and a steady state, the $\Delta I_L$ flowing through the inductor 107 can be represented by the equation (5), where Vi denotes the input voltage, the Vo denotes the output voltage, D denotes the duty ratio, L denotes the inductance of the inductor 107 and f denotes the switching frequency:

$$\Delta I_L = Vo(1-D)/(fL) = (Vi-Vo)D/(fL) \tag{5}$$

Here, the relationship of Vo=Vi×D holds. When the ripple current ΔIL flows to the smoothing capacitor 109, the ripple voltage ΔVo (inter-peak value) generated at the output terminal 111 will be the following equation (6), where equivalent series resistance of the capacitor 109 is represented as Equivalent Series Resistance (ESR), $$\Delta Vo = ESR \times \Delta I_L \tag{6}$$

Therefore, since the ripple voltage ΔVo is in inverse proportion to the switching frequency f, when the charger 100 operates at a low switching frequency f in a state of a high output voltage at the end of the constant current area, the peak value of the output voltage on which the ripple voltage is superimposed will be increased.

Figure 4:
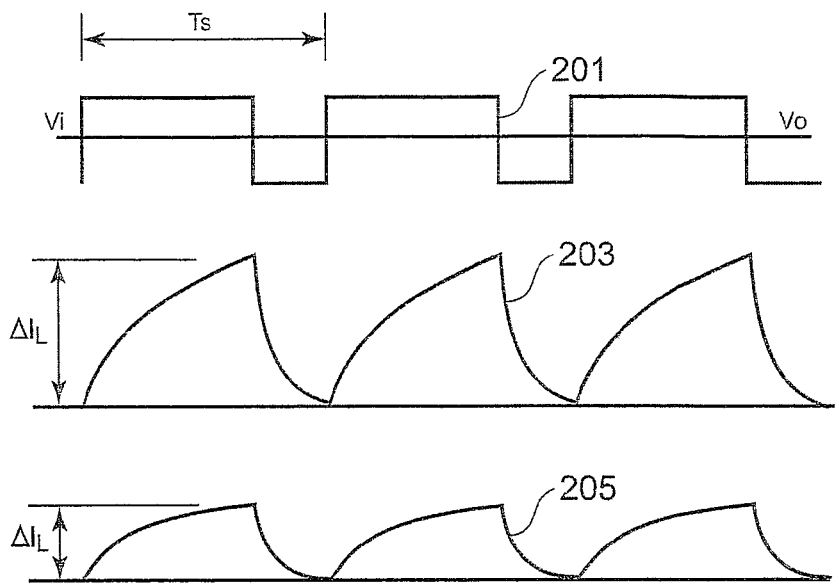
FIG. 4 illustrates a state where a ripple current changes when a switching frequency is changing near the end of constant current charge.

FIG. 4 illustrates a state where the ripple current changes when the switching frequency is changed near the end of the constant current area. The line 201 indicates a state where the output voltage Vo is generated as an average value by switching-controlling the input voltage Vi with the period Ts as a function of the switching frequency. The line 203 indicates a ripple current when the switching frequency is set at 200 KHz from the beginning and near the end of the constant current area. The line 205 indicates a ripple current when the switching frequency is changed to 200 KHz near the end of the charge of the constant current area.

The ripple voltage ΔVo is superimposed on the charge voltage Vo charging the battery pack 21. When the ripple voltage is superimposed on the charge voltage, the protection fuse operates in response to the ripple voltage. The average value of the output voltage Vo of the charger 100 has to be set at a value not letting the protection fuse operate with the ripple voltage. When the ripple voltage is large, the output voltage has to be decreased. When the output voltage is decreased, however, charge cannot be performed sufficiently when the charger reaches a full-charge state.

When a charger operates at a constant switching frequency over the entire constant current area and the entire constant voltage area as in a conventional manner, the switching frequency for operation is set at 400 KHz, for example, so as not to melt the protection fuse at the constant voltage area where the output voltage becomes the highest. When the switching frequency at the constant current area is lowered to 200 KHz lower than the conventional one, the ripple voltage is increased. When the switching operation is continued at the switching frequency of 200 KHz even when the output voltage increases as the charge proceeds, there is a possibility of the ripple voltage melting the protection fuse at the constant current area. Therefore the switching frequency has to be changed at appropriate timing.

Figure 5:
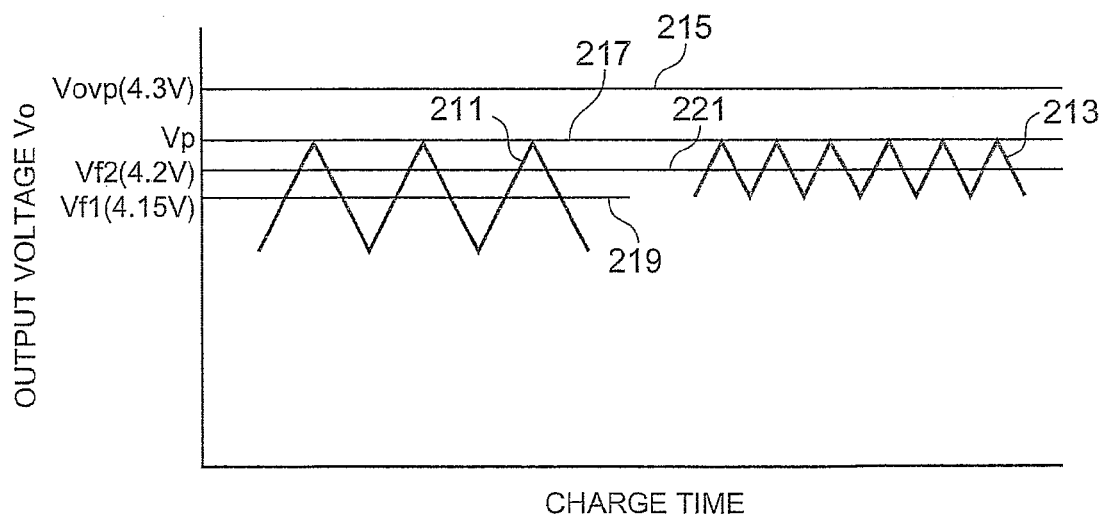
FIG. 5 illustrates a method for deciding the timing for changing switching frequency.

FIG. 5 describes a method for deciding timing for changing the switching frequency or the establishment of a frequency changing condition. The vertical axis represents the output voltage Vo of the charger 100. The output voltage waveform 211 represents a voltage at a time close to the end of the constant current charge duration when the charger 100 operates at the switching frequency of 200 KHz, and the output voltage waveform 213 represents a voltage during the constant voltage charge duration. The output voltage waveforms 211 and 213 include the ripple voltage superimposed on the DC voltage.

The output voltage is converted into a cell voltage for description. The line 215 indicates a protection voltage Vopv at which the protection fuse of the battery pack 21 operates. The protection voltage Vopv is 4.3 V, for example. The line 217 indicates a peak voltage Vp matching with the peak values of the output voltage waveforms 211 and 213. The line 219 indicates an average voltage Vf1 of the output voltage waveform 211 and the line 221 indicates an average voltage Vf2 of the output voltage waveform 213. In an example, the average voltage Vf1 is 4.15 V and the average voltage Vf2 is 4.2 V.

During the constant voltage charge duration, the output voltage is maintained at the set voltage (Vf2), and charge voltage becomes the highest among the entire charge duration. Between the peak voltage Vp and the protection Vovp is provided a margin so as not to let the protection fuse operate. Then, the average voltage Vf2 is set as the set voltage of the charger 100 so that the peak value of the output voltage waveform 213 matches with the peak voltage Vp. The charge voltage of a charge cell in the battery pack 21 increases as the charge at the constant current area proceeds.

Therefore, when the charger 100 operates at the switching frequency of 200 KHz and the charge voltage increases, the switching frequency is changed to 400 KHz at timing when the peak value of the output voltage waveform 211 matches with the peak voltage Vp or immediately before the timing so as to decrease the ripple voltage. Thereafter even when the charge voltage further increases, a margin for the protection voltage Vovp can be secured equal to or less of the margin at the constant voltage area. The relationship between the average voltages Vf1 and Vf2 and the peak voltage Vp can be found by experiments. The changing of the switching frequency to 400 KHz before the peak value of the output voltage waveform 211 reaching the peak value Vp is not preferable because such changing causes a wasted temperature rise at the FETs 103 and 105.

[Charge Method]

Figure 6:
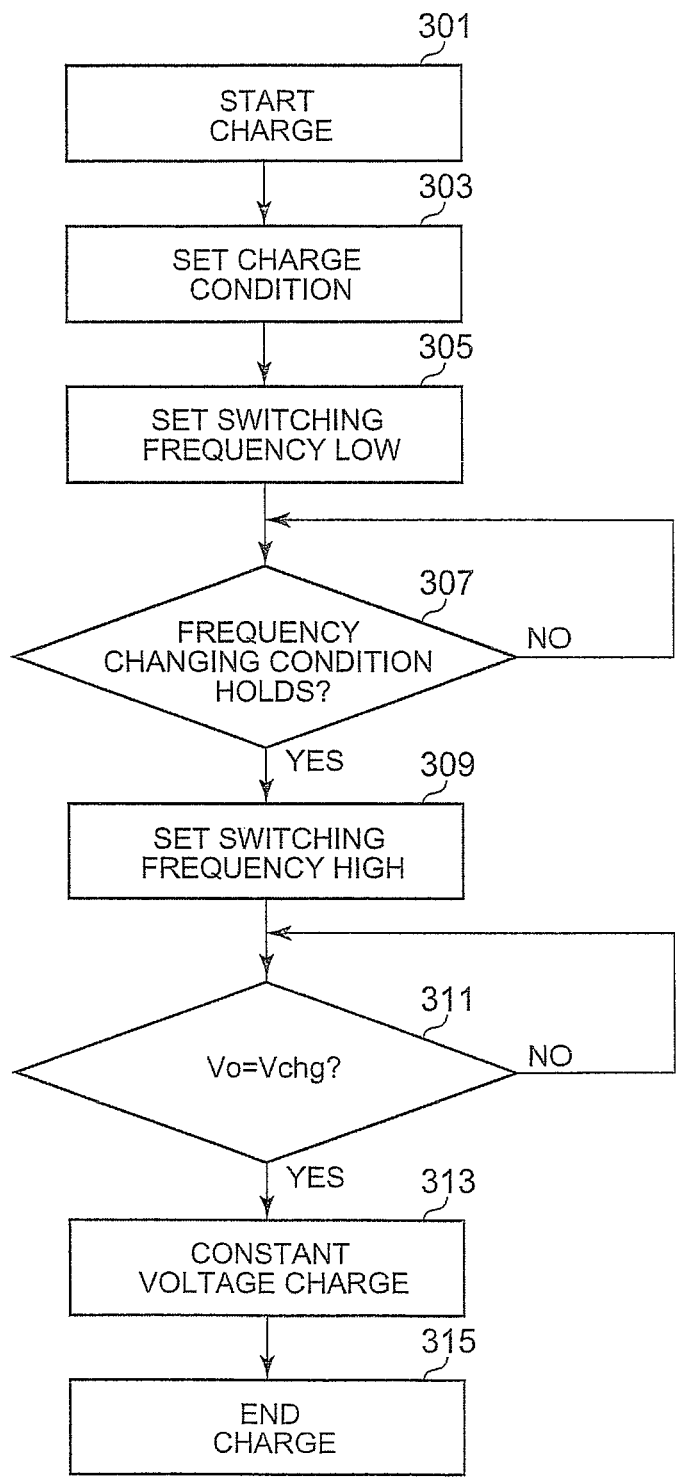
FIG. 6 is a flowchart illustrating the operation of a battery charger.
Figure 7:
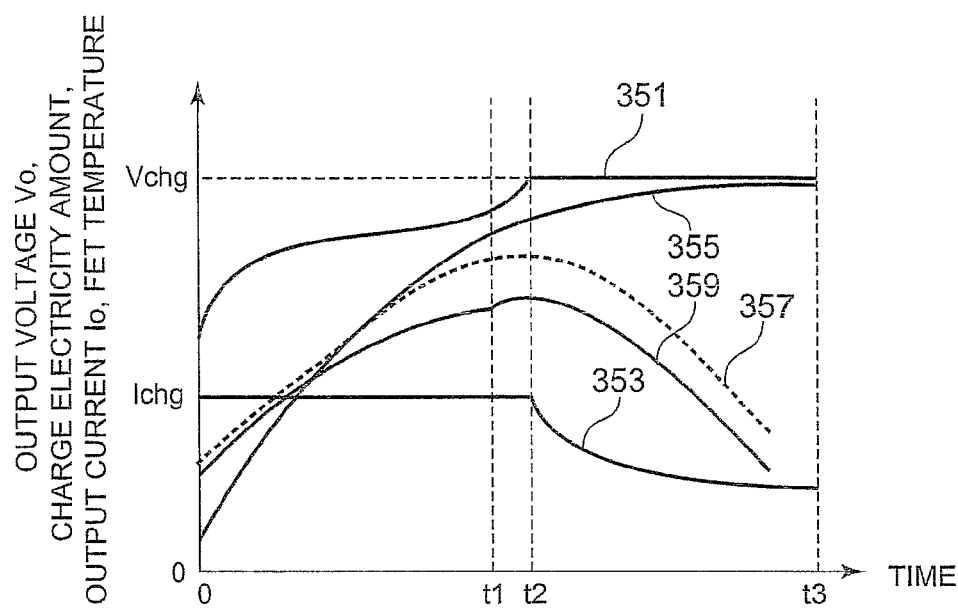
FIG. 7 illustrates characteristics of a battery charger and a battery pack during a charge operation.

FIG. 6 is a flowchart illustrating the operation of the charger 100 incorporated in the portable computer 10. FIG. 7 illustrates states of the charger and the battery pack during charge. At block 301 of FIG. 6, the portable computer 10 is connected with the AC/DC adaptor 27. The frequency changing circuit 130 is reset and a low signal is input to the frequency setting circuit 157 so that a frequency changing signal is negated. At block 303, the battery pack 21 internally detects the remaining electrical amount and determines that charge is necessary, and informs the EC 23 of the set current Ichg and the set voltage Vchg through the SM bus. At this time, in order to request quick charge, the battery pack 21 requests charge at the set current of 2 C.

When the battery pack 21 requests charge and the charge starts, the charger 100 initially performs charge at the constant current area. At block 305, since a low signal is input to the frequency setting circuit 157, the PWM control circuit 151 sets the switching frequency at 200 KHz for operation. Since a battery cell with less remaining electricity amount has a low voltage, the PWM control circuit 151 lets the FETs 103 and 105 operate at a relatively small duty ratio required to maintain the set current Ichg.

In FIG. 7, the line 351 indicates the output voltage Vo of the charger 100, the line 353 indicates the charge current Io, the line 355 indicates the remaining electricity amount or the charge electricity amount, and the line 359 indicates a temperature of the FET 103. Duration from a time 0 to time t2 indicates the constant current charge duration, and duration from time t2 to time t3 indicates the constant voltage charge duration. The line 357 indicates a temperature of the FET 103 when a conventional charger having the same condition other than the switching frequency performs charge while setting the switching frequency at 400 KHz from the starting of the charge to the end of the charge without the present invention being applied thereto.

As the charge at the constant current area proceeds, the voltage of a battery cell increases, and therefore the PWM control circuit 151 gradually increases the duty ratio to maintain the set current Ichg for the control of the operation of the FETs 103 and 105. Since the FETs 103 and 105 operate at 200 KHz, the FET loss is smaller than the case of the operation of 400 KHz, and a temperature rise becomes slow as indicated with the line 359. At block 307, the frequency changing circuit 130 determines whether a frequency changing condition holds or not. Referring back to FIG. 5, the frequency changing condition holds when the peak value of the ripple voltage superimposed on the output voltage Vo matches with the peak value Vp of the line 217. The frequency changing condition is preferably set within a range where the ripple voltage included in the output voltage does not melt the protection fuse protecting the battery pack 21 and at timing when the charge electricity amount becomes the largest.

At time t1 when the peak value of the output voltage Vo exceeds the breakdown voltage of the zener diode 131 corresponding to the peak voltage Vp, the frequency changing circuit 130 transmits a frequency changing signal to the frequency setting circuit 157. At block 309, at time t1, the PWM control circuit 151 changes the switching frequency into 400 KHz. Time t1 is during the constant current charge duration and immediately before the switching from the constant current charge to the constant voltage charge. In one example, during the constant current charge duration, the ratio of the operation time at 200 KHz and the operation time at 400 KHz is 9:1 and the charger 100 mostly performs switching-control at 200 KHz.

During duration from time t1 to time t2, the charge current Io is equal to the set current Ichg and the switching frequency is at 400 KHz, and therefore the heat generation amount of the FET 103 becomes the same as the line 357 and so the temperature rise gradient of the line 359 agrees with that of the line 357. Then, as the constant current charge further proceeds, at block 311 the PWM control circuit 151 determines that the output voltage Vo reaches the set voltage Vchg on the basis of the voltage signal from the current/voltage detection circuit 120.

Since the temperature rise of the FET 103 is suppressed from time 0 to time t1, the temperature of the FET 103 indicated with the line 359 at time t2 is lower than the temperature of the FET 103 indicated with the line 357. At block 313 where the charger shifts to the constant voltage charge, the PWM control circuit 151 controls the FETs 103 and 105 with a much smaller duty ratio so that the output voltage Vo does not exceed the set voltage Vchg. In the constant voltage area, a difference between the output voltage Vo and the cell voltage gradually decreases, and the duty ratio to maintain the set voltage Vchg accordingly decreases and the output current also gradually decreases.

Therefore, in the constant voltage area, the continuity loss decreases, and so the temperature of the FET 103 decreases.

In the constant voltage area, since the switching frequency is set at 400 KHz, the ripple voltage is smaller than at 200 KHz, and the protection fuse of the battery pack 21 does not melt. When a charger in a PWM control manner has a large difference between the input voltage and the output voltage, ON duration is not provided for every continuous period when the output current becomes very small, and instead ON duration is provided while skipping a plurality of periods. A charger operating in this way so as to change the apparent switching frequency when the output current is small also is included in the scope of the chargers in a PWM control manner according to the present invention.

At block 315, the current/voltage detection circuit 120 detects that the output current decreases to a predetermined value at time t3, the PWM control circuit 151 stops the charge and resets the frequency changing circuit 130. The above description deals with the case where the frequency changing condition is determined on the basis of the output voltage Vo (average voltage) of the charger 100 at block 307. However, such a determination is made on the basis of a voltage (average voltage) of a battery cell received from the battery pack 21. Further, the timing when the peak value of the ripple voltage mixed in the output voltage Vo reaches the peak voltage Vp at the switching frequency of 200 KHz can be specified by methods using a factor other than the voltage.

One of such methods includes a method using the remaining electricity amount in the battery cell. As illustrated in FIG. 7, a voltage of a battery cell during charge increases with an increase of the remaining electricity amount. Thus, the battery pack 21 infoiins the EC 23 about the remaining electricity amount reaching a predetermined value, and the EC 23 transmits a frequency changing signal to the frequency setting circuit 157 as illustrated in FIG. 3. The remaining electricity amount for the changing condition may be SOC 70% in one example.

As another method, the duty ratio may be used. During the constant current charge duration, as the voltage of the battery cell increases, the duty ratio gradually increases so as to keep the output current Io at the set current Ichg. Therefore, as illustrated in FIG. 3, the PWM control circuit 151 may transmit a frequency changing signal to the frequency setting circuit 157 when the duty ratio reaches a predetermined value so as to change the switching frequency. As still another method, as illustrated in FIG. 3, the charge control circuit 150 may be provided with the peak voltage detection circuit 161 detecting that the peak value of the output voltage including a ripple voltage reaches the peak voltage Vp and then transmits a frequency changing signal to the frequency setting circuit 157 to change the switching frequency.

As has been described, the present invention provides a method for suppressing heat generated by a semiconductor switch within a battery charger. A charge system according to the present embodiment may be widely used not only for the incorporation into a portable computer but also for devices to charge a battery for motor vehicles and to charge a battery for tools.

While the invention has been particularly shown and described with reference to a preferred embodiment, it will be understood by those skilled in the art that various changes in form and detail may be made therein without departing from the spirit and scope of the invention.

What is claimed is:

1. A charge system comprising:
    a switching device that performs switching of a DC input voltage at a predetermined switching frequency to generate an output voltage, the output voltage being for charging a battery; and
    a controller for allowing said switching device to operate at a first switching frequency immediately after starting of charge and to operate at a second switching frequency when a frequency changing condition holds, wherein said second switching frequency is higher than said first switching frequency, wherein said controller controls said battery in a constant current/constant voltage control manner, wherein said controller allows said switching device to operate at said first switching frequency during most of said constant current charge duration, and at said second switching frequency during a part of said constant current charge duration and during the entire portion of said constant voltage charge duration.

2. The charge system of claim 1, wherein said frequency changing condition is set within a range where a protection circuit does not operate with a ripple voltage included in said output voltage, wherein said protection circuit being configured to protect said battery, and at timing when a charge electricity amount becomes the highest.

3. The charge system of claim 1, wherein said switching device includes a first switching device and a second switching device operating in a synchronous rectification manner.

4. The charge system of claim 1, wherein said controller determines that said frequency changing condition holds when an average value of said output voltage reaches a predetermined value during said constant current charge duration.

5. The charge system of claim 1, wherein said controller determines that said frequency changing condition holds when a remaining electricity amount of said battery reaches a predetermined value during said constant current charge duration.

6. The charge system of claim 1, wherein said controller determines that said frequency changing condition holds when a duty ratio of said switching device reaches a predetermined value during said constant current charge duration.

7. The charge system of claim 1, wherein said controller determines that said frequency changing condition holds when a peak value of said output voltage, including a ripple voltage reaches a predetermined value during said constant current charge duration.

8. The charge system of claim 1, wherein said battery is a lithium battery.

9. The charge system of claim 8, wherein said battery is of a quick-charge type capable of being charged with a charge current exceeding 1 C.

* * * * *